(12) United States Patent
Chung

(10) Patent No.: US 6,800,808 B1
(45) Date of Patent: Oct. 5, 2004

(54) CABLE FIXING STRUCTURE ON FLAT PANEL

(75) Inventor: Ming-Tsai Chung, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 0 days.

(21) Appl. No.: 10/740,681

(22) Filed: Dec. 22, 2003

(51) Int. Cl.7 ................................................ H02G 3/18
(52) U.S. Cl. ........................ 174/59; 174/100; 174/55; 174/135; 439/544
(58) Field of Search .......................... 174/100, 59, 55, 174/57, 65 R, 48, 135; 439/544, 545, 546

(56) References Cited

U.S. PATENT DOCUMENTS

| | | | |
|---|---|---|---|
| 5,888,093 A | * | 3/1999 | Polgar et al. ............... 439/546 |
| 6,305,963 B1 | * | 10/2001 | Felps ........................ 439/317 |
| 6,670,552 B2 | * | 12/2003 | Kuroda et al. ................ 174/59 |
| 6,695,643 B2 | * | 2/2004 | Wu ............................ 439/545 |
| 6,722,924 B1 | * | 4/2004 | Zhou et al. ................. 439/608 |

* cited by examiner

Primary Examiner—Dhiru R Patel
(74) Attorney, Agent, or Firm—Bacon & Thomas PLLC

(57) ABSTRACT

A cable fixing structure on a flat panel is to have an elliptical through hole on the flat panel of an electronic device enclosure, a protruding joint board is on the end of the connector of a cable, an upper and lower panel wedge each is near the top and lower portion of the elliptical through hole, wherein the shape and physical size of the joint board is equal to the elliptical through hole, the joint board is in parallel with the end of the connector, an upper and a lower joint wedges corresponding to the panel wedges are on the inner edge of the joint board. While installing the connector onto the panel, the joint board passes through the elliptical through hole enabling the upper and lower joint wedges to reach the upper and lower panel wedges by turning the connector. Thus, the connector of the cable is easily and rapidly fixed to the flat panel.

4 Claims, 3 Drawing Sheets

CABLE FIXING STRUCTURE ON FLAT PANEL

BACKGROUND OF THE INVENTION

I. Field of the Invention

This invention relates generally to a cable fixing structure and, more specifically, to a cable fixing structure on a flat panel that fixes and connects a cable on the panel of an electronic device easily and rapidly.

II. Description of the Prior Art

Heretofore, it is known that cable fixing method on the enclosure of an electronic device (a switch box for example) is to have a upper semicircle through hole on the upper half on the enclosure, and have another lower semicircle through hole corresponding to the upper semicircle through hole on the edge of the lower half on the enclosure; a connector is on the cable, the connector has a installation slot corresponding to the upper and lower semicircle through holes, when the upper and lower enclosures are assembled together, the installation slot is installed into the upper and lower semicircle through holes and have the connector fixed on the upper and lower semicircle through holes, the cable is connected to the enclosure of the electronic device.

The known prior art must has the connector fixed on the upper and lower semicircle through holes when the upper and lower enclosures are assembled together, if users want to replace the cable while the upper and lower enclosures are assembled together, they must open the upper and lower enclosures and reassemble the upper and lower enclosures to have the connector installed on the upper and lower semicircle through holes, such method is very tedious and very inconvenient.

SUMMARY OF THE INVENTION

It is therefore a primary object of the invention to provide a cable fixing structure on flat panel that fixes and connects a cable on the panel of an electronic device easily and rapidly.

In order to achieve the objective set forth, a cable fixing structure on flat panel in accordance with the present invention is to have an elliptical through hole on the panel of an electronic device enclosure, a protruding joint board is on the end of the connector of a cable, an upper and lower panel wedge each is near the top and lower portion of the elliptical through hole on the inner edge of the panel; the shape and physical size of the joint board is equal to the elliptical through hole on the panel, the joint board is in parallel with the end of the connector, a connecting port is between the joint board and the connector, the width of the connecting port is equal to that of the panel, the panel is wedged between the joint board and the connector; an upper and a lower joint wedges corresponding to the panel wedges are on the inner edge of the joint board. When the connector is installed onto the panel, the joint board passes through the elliptical through hole, the connector is turned and the upper and lower joint wedges reach the upper and lower panel wedges, the connector fixes the joint board on the panel, the cable connects to the electronic device enclosure.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
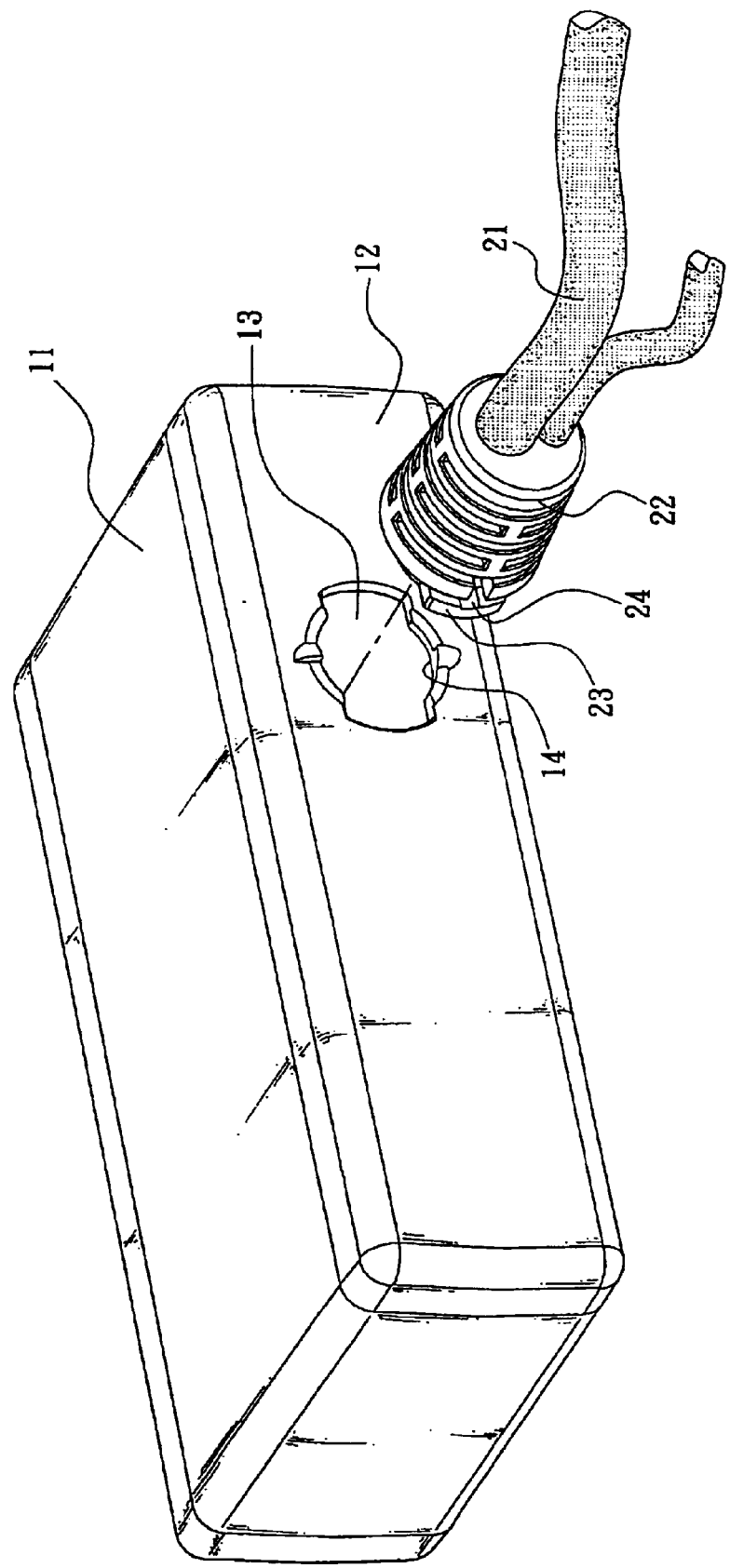
FIG. 1 is a perspective view of the present invention.
Figure 2:
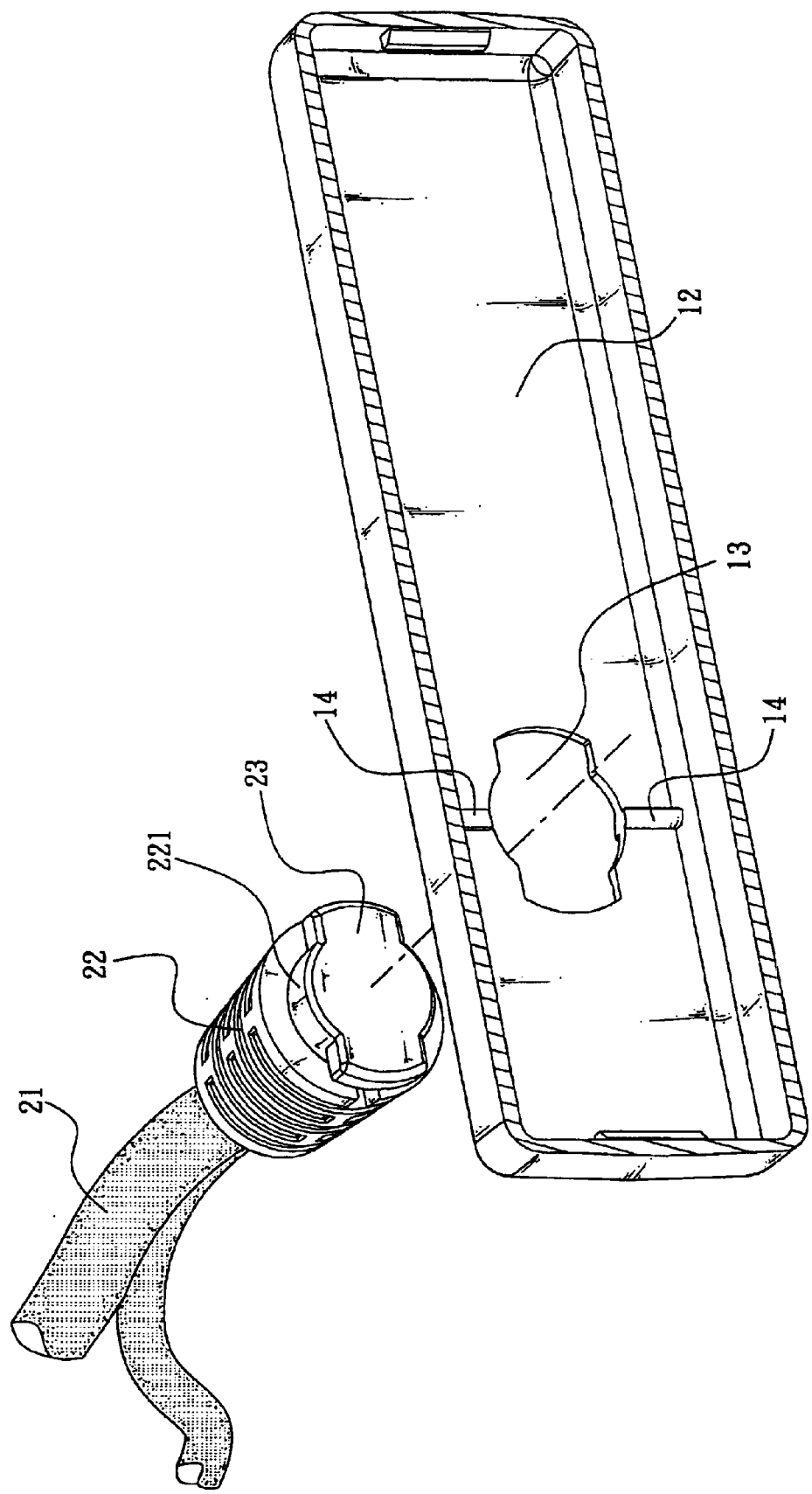
FIG. 2 is another perspective view of the present invention.

Referring to FIG. 1 and FIG. 2, the present invention is to have an elliptical through hole 13 on the panel 12 of an electronic device (a network switch box for example) enclosure 11, a protruding joint board 23 is on the end of the connector 22 of a cable 21, an upper and lower panel wedge 14 each is near the top and lower portion of the elliptical through hole 13 on the inner edge of the panel 12; the shape and physical size of the joint board 23 is equal to the elliptical through hole 13 on the panel 12, the joint board 23 is in parallel with the end of the connector 22, a connecting port 221 is between the joint board 23 and the connector 22, the width of the connecting port 221 is equal to that of the panel 12, the panel 12 is wedged between the joint board 23 and the connector 22; an upper and a lower joint wedge 24 corresponding to the panel wedge 14 are on the inner edge of the joint board 23.

Figure 3:
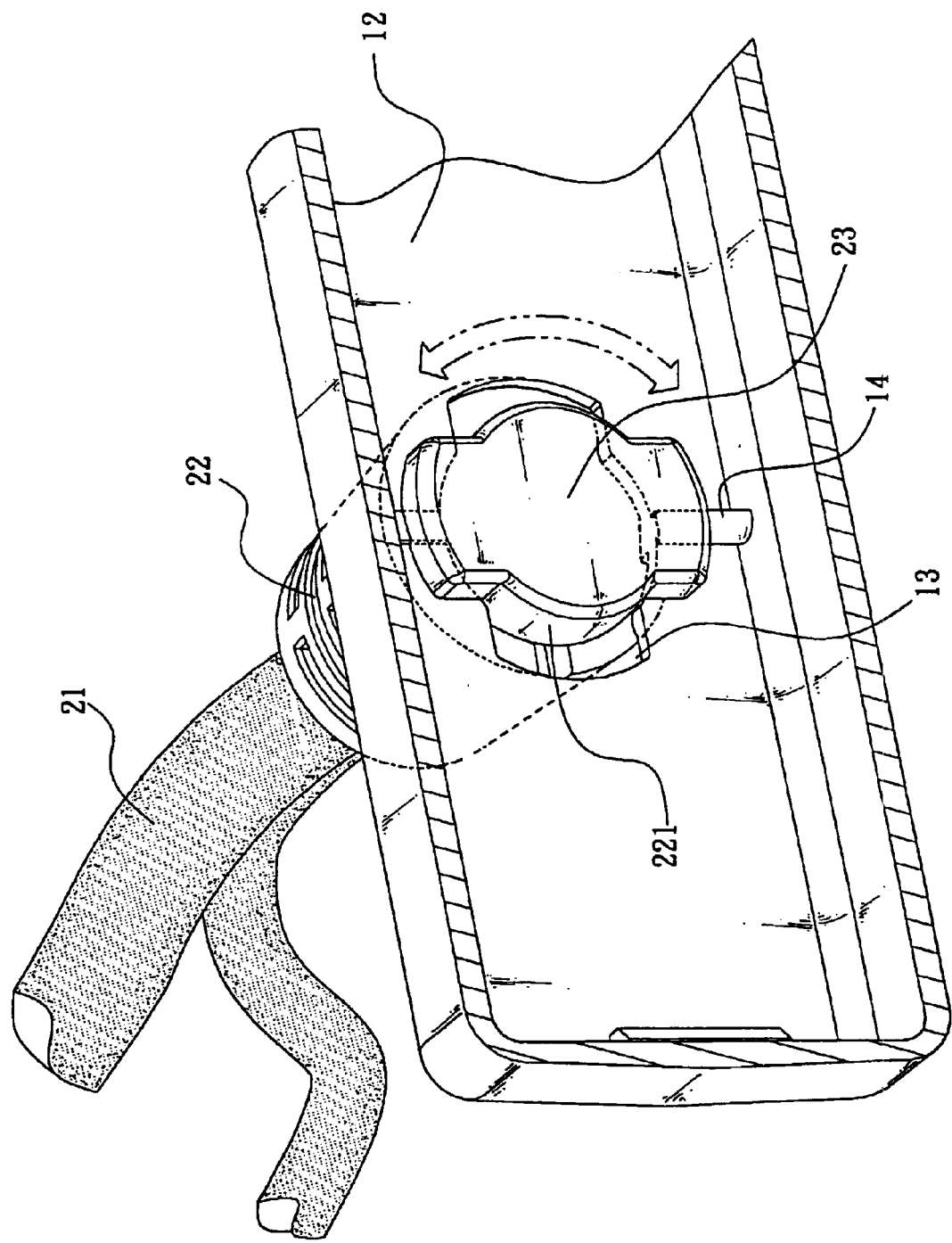
FIG. 3 is an assembly view of the present invention.

Based on the structure described above and referring to FIG. 1, FIG. 2 and FIG. 3, when the connector 22 is installed onto the panel 12, the joint board 23 passes through the elliptical through hole 13, the connector 22 is turned and the upper and lower joint wedge 24 reach the upper and lower panel wedge 14, the connector 22 fixes the joint board 23 on the panel 12, the cable 21 connects to the electronic device enclosure 11.

As an application and referring to FIG. 1 and FIG. 2, an elliptical through hole 13 on the panel 12 of an electronic device enclosure 11, a protruding joint board 23 is on the end of the connector 22 of a cable 21, a protruding stripe each near the top and lower portion of the elliptical through hole 13 is on the inner edge of the panel 12, the shape and physical size of the joint board 23 is equal to the elliptical through hole 13 on the panel 12, the joint board 23 is in parallel with the end of the connector 22, a connecting port 221 is between the joint board 23 and the connector 22, the width of the connecting port 221 is equal to that of the panel 12, the panel 12 is wedged between the joint board 23 and the connector 22; a concave stripe each corresponding to the protruding stripe is on top and lower portion on the inner brim of the joint board 23.

Based on the structure described above and referring to FIG. 2 and FIG. 3, when the connector 22 is installed onto the panel 12, the joint board 23 passes through the elliptical through hole 13, the connector 22 is turned and the protruding stripes are wedged into the concave stripes, the connector 22 fixes the joint board 23 on the through hole 13 also on the panel 12, the cable 21 connects to the electronic device enclosure II.

As another application and referring to FIG. 1 and FIG. 2, an elliptical through hole 13 on the panel 12 of an electronic device enclosure 11, a protruding joint board 23 is on the end of the connector 22 of a cable 21, a concave slot each is on top and bottom of the inner edge of the panel near the through hole 13, the shape and physical size of the joint board 23 is equal to the elliptical through hole 13 on the panel 12, the joint board 23 is in parallel with the end of the connector 22, a connecting port 221 is between the joint board 23 and the connector 22, the width of the connecting port 221 is equal to that of the panel 12, the panel 12 is wedged between the joint board 23 and the connector 22; a protruding stripe each corresponding to the concave slot is on top and lower portion on the inner brim of the joint board 23.

Based on the structure described above and referring to FIG. 2 and FIG. 3, when the connector 22 is installed onto the panel 12, the joint board 23 passes through the elliptical through hole 13, the connector 22 is turned and the protruding stripes are wedged into the concave slots, the connector 22 fixes the joint board 23 on the through hole 13 also on the panel 12, the cable 21 connects to the electronic device enclosure 11.

While a preferred embodiment of the invention has been shown and described in detail, it will be readily understood and appreciated that numerous omissions, changes and additions may be made without departing from the spirit and scope of the invention.

What is claimed is:

1. A cable fixing structure on a flat panel comprising:

an elliptical through hole on said panel of an electronic device enclosure;

an upper and lower panel wedges each is near the top and lower portion of said elliptical through hole, a protruding joint board is on an end of a connector of said cable, the shape and physical size of said joint board is equal to said elliptical through hole on said panel, said joint board is in parallel with the end of said connector, a connecting port is between said joint board and said connector, the width of said connecting port is equal to that of said panel, said panel is wedged between said joint board and said connector, an upper and a lower joint wedges of said connector corresponding to said panel wedges are on the inner edge of said joint board, when said connector is installed onto said panel, said joint board passes through said elliptical through hole, said connector is turned and said upper and lower joint wedges of said connector reach said upper and lower panel wedges, said connector fixes said joint board on said panel, said cable connects to said electronic device enclosure.

2. The cable fixing structure on flat panel recited in claim 1, wherein said panel wedges are protruding stripes, said joint wedges are concave stripes.

3. The cable fixing structure on flat panel recited in claim 1, wherein said panel wedges are concave slots, said joint wedges are protruding slots.

4. The cable fixing structure on flat panel recited in claim 1, wherein said electronic device is a network switch box.

\* \* \* \* \*